Inventor
H. L. Gooch
By Clarence A. O'Brien
Attorney

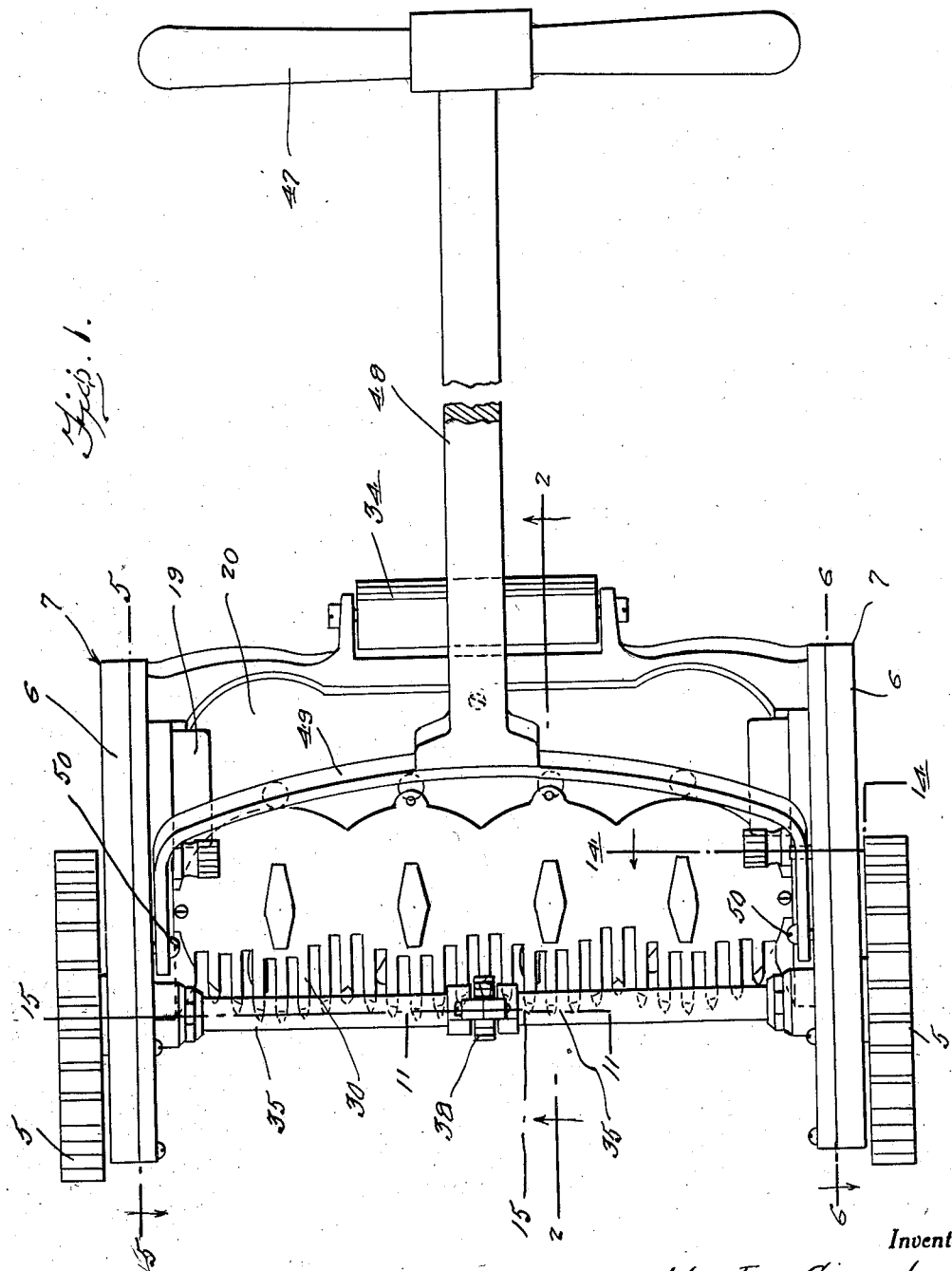

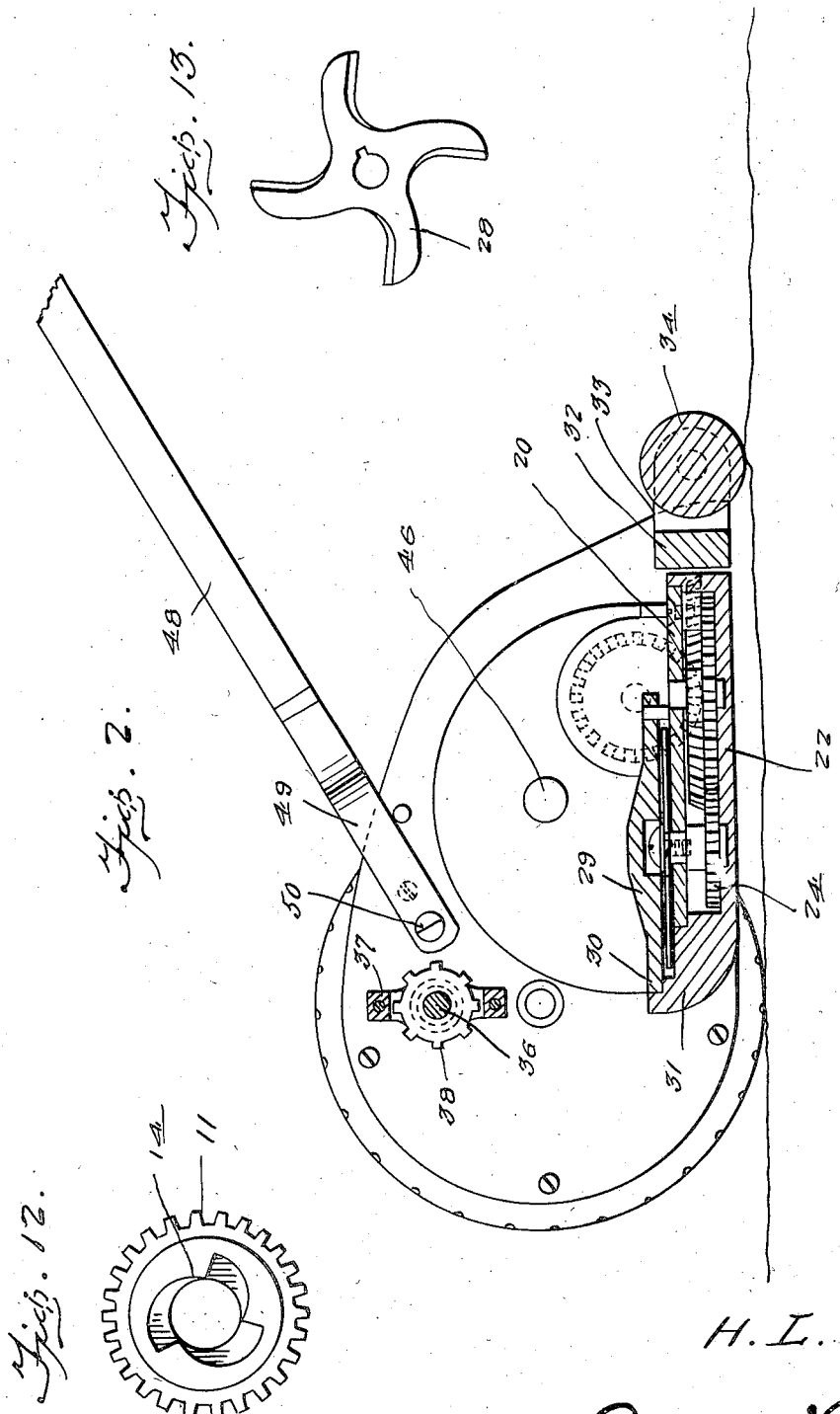

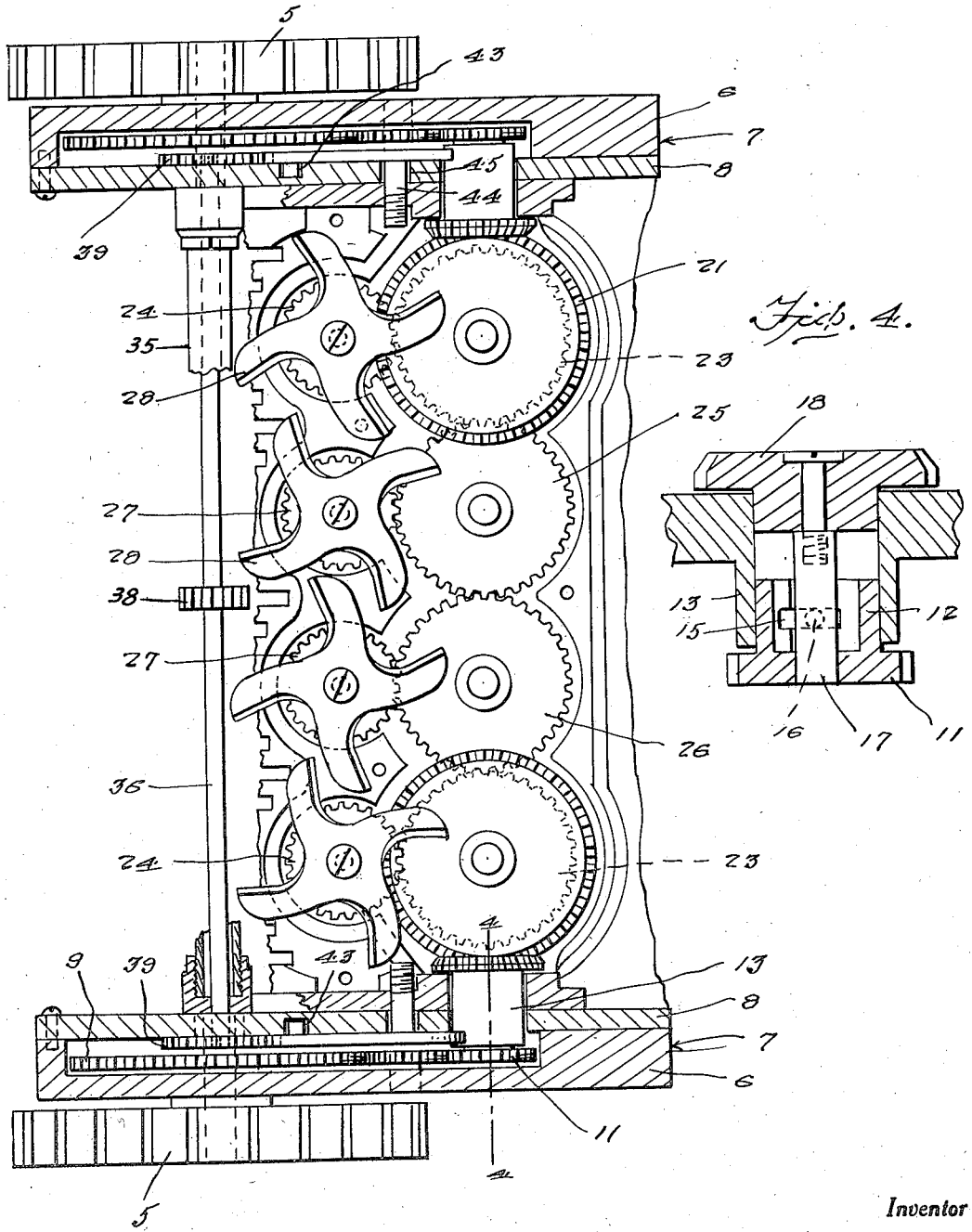

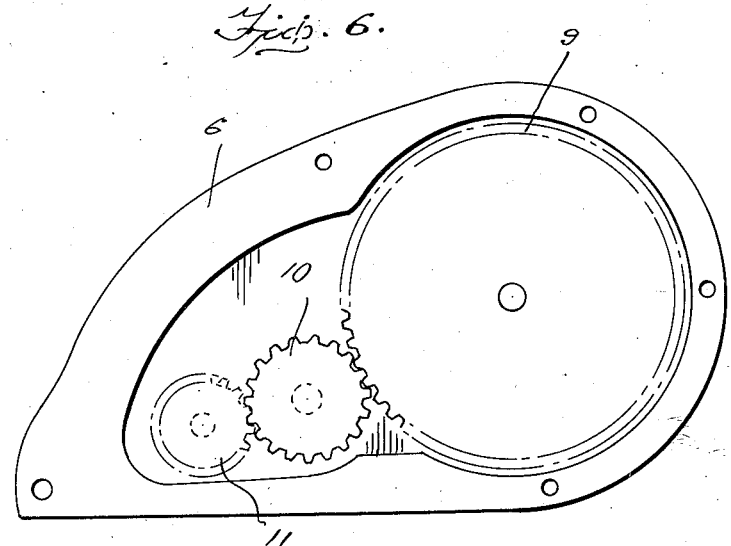
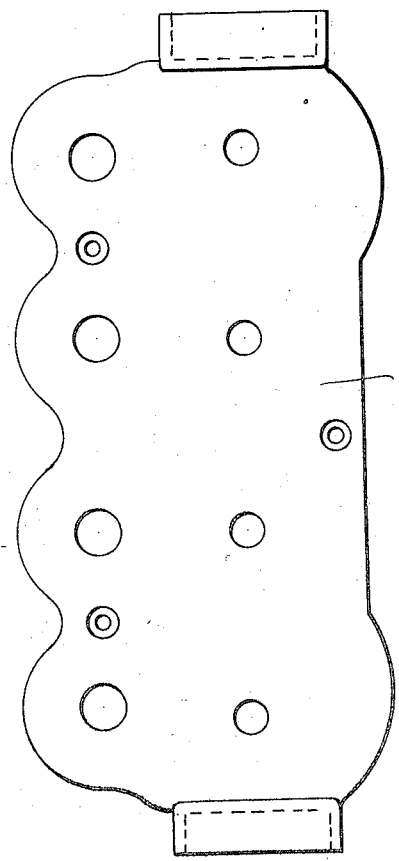
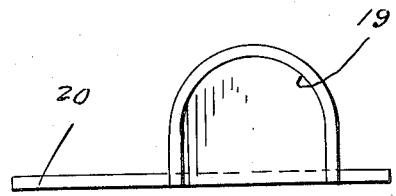
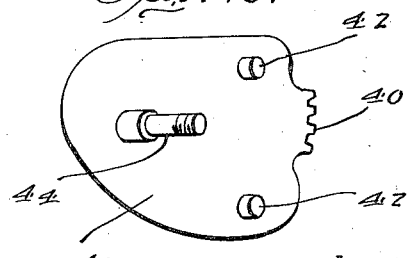

Oct. 8, 1935.                H. L. GOOCH                    2,016,939
                              LAWN MOWER
                         Filed Aug. 3, 1934           6 Sheets—Sheet 6

Inventor
H. L. Gooch

By *Clarence A. O'Brien*
                                                        Attorney Patented Oct. 8, 1935

2,016,939

UNITED STATES PATENT OFFICE 2,016,939

LAWN MOWER

Herbert L. Gooch, Coral Gables, Fla., assignor to Josephine A. Gooch, Miami, Fla.

Application August 3, 1934, Serial No. 738,337

2 Claims. (Cl. 56—255)

This invention appertains to new and useful improvements in lawn mowers and more particularly to a mower of the horizontal cutter moving type.

The principal object of the present invention is to provide a lawn mower wherein a plurality of cutters are mounted for rotation on a horizontal plane, with the blades of the cutters interlapping during the operation of said cutters.

Another important object of the invention is to provide a lawn mower employing a plurality of individual cutters with the blades thereof operating in opposed relation.

Other important objects of the invention reside in the adjustability of the cutter assembly and the facility of permitting repair and replacement of parts.

These and various other important objects and advantages of the invention will become apparent to the reader of the following specification.

In the drawings:

Figure 1 represents a top plan view of the machine.

Figure 2 is a vertical sectional view taken substantially on line 2—2 of Figure 1.

Figure 3 is a fragmentary horizontal sectional view through the machine with the top plate removed.

Figure 4 is a fragmentary detailed sectional view taken substantially on line 4—4 of Figure 3.

Figure 6 is a sectional view taken substantially on line 6—6 of Figure 1.

Figure 7 is a top plan view of the bottom plate.

Figure 8 is a side elevational view of one of the gear casings.

Figure 10 is a perspective view of one of the rockers.

Figure 12 is an elevational view of the gear in one of the clutch connections.

Figure 13 is a top plan view of one of the cutters.

Figure 5:
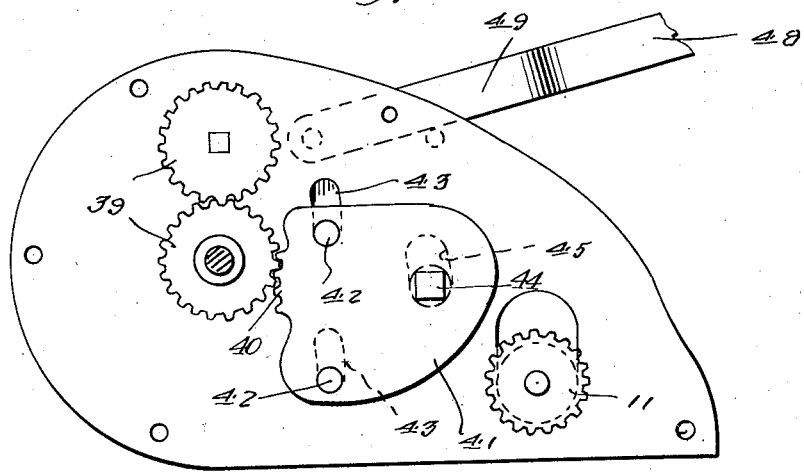
Figure 5 is a fragmentary vertical sectional view taken substantially on line 5—5 of Figure 1.
Figure 11:
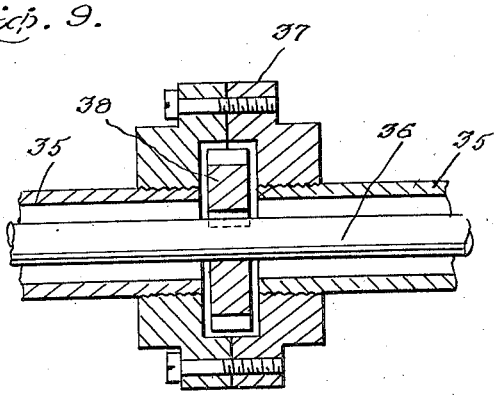
Figure 11 is a fragmentary detailed sectional view taken substantially on line 11—11 of Figure 1.
Figure 9:
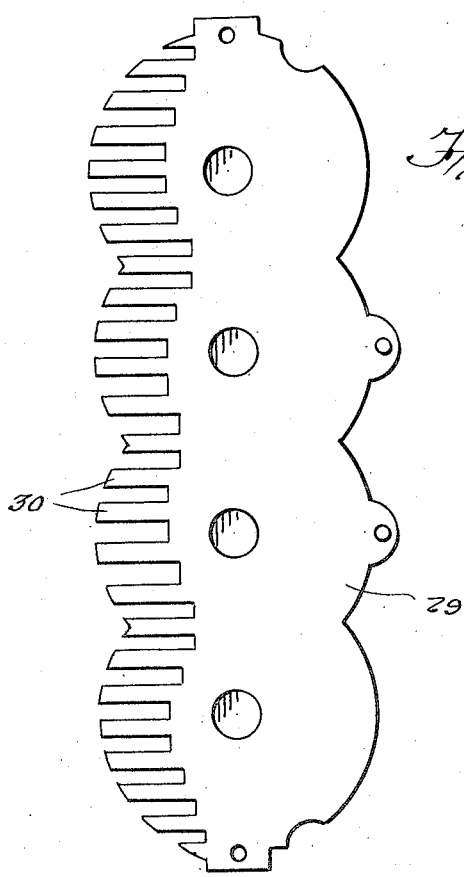
Figure 9 is a bottom plan view of the top plate.
Figure 14:
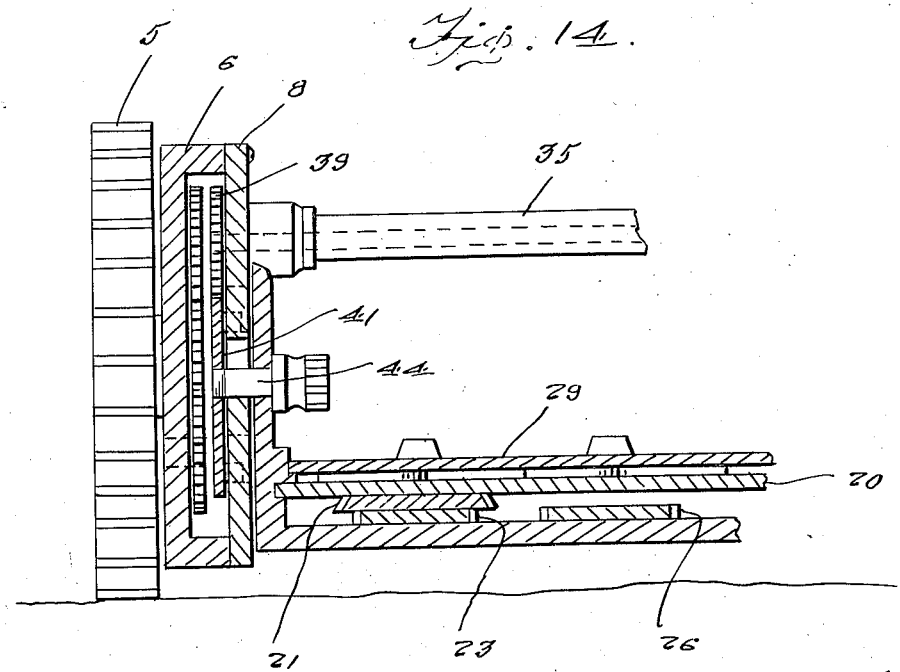
Figure 14 is a fragmentary detailed sectional view taken substantially on line 14—14 of Figure 1.
Figure 15:
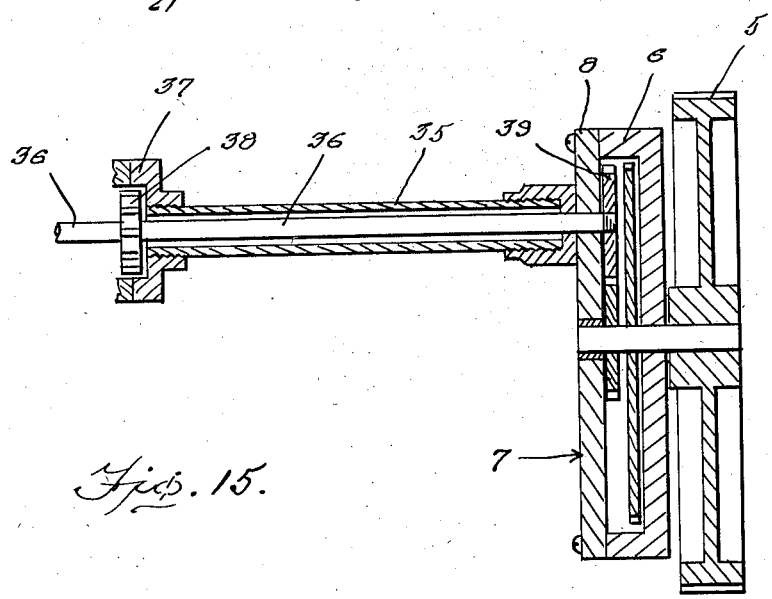
Figure 15 is a fragmentary detailed sectional view taken substantially on line 15—15 of Figure 1.

Referring to the drawings wherein like numerals designate like parts, it can be seen that numerals 5—5 represent the traction wheels which are journaled through the outer walls 6—6 of the gear housings 7—7. These gear housings 7—7 each have an inner wall 8.

Each of the traction wheels 5 drives a gear 9 in its adjacent housing 7 which, in turn, by way of the idler gear 10, drives a pinion 11.

This pinion 11 is provided with a tubular extension 12 which fits within a tubular bearing 13. (See Figure 4.) The tubular extension 12 is provided with ratchet formations 14, grooved as at 15 to receive a ball 16. Obviously, this gear 11 is free to rotate in one direction when the ball is abutting a shoulder of one of the ratchet formations 14, but when the machine is pushed forwardly, there will be a binding action between the cam side of the ratchet formation 14 and the ball so as to bind the same against the shaft 17 which extends from the bevel gear 18. This bevel gear 18 is located within a casing 19 secured to the plate 20.

It will be observed in Figure 3, that each of the bevel gears 18 drives a horizontally mounted bevel gear 21 rotatably supported upon the bottom plate 22. Co-acting with each of these bevel gears 21 is a gear 23 meshing with a pinion 24.

By referring to Figure 3, it will be seen that there are two intermediate gears 25 and 26 which mesh with each other and with the above mentioned gears 23—23. These gears 25 and 26 mesh with intermediate pinions 27 and 27, respectively, which have shafts journaled through the plate 20. These shafts as well as the shafts of the gears 24—24 are vertically disposed and each is equipped at its upper end with a four-blade rotary cutter 28, the blades being radially disposed as and in the manner substantially shown in Figure 13.

It will be observed that numeral 29 which is the top plate is formed with forwardly extending teeth 30 as is the forwardmost portion of the bottom plate 22 as at 31. It will also be observed that when the traction wheels 5—5 are in operation, the drive to the cutters 28 causes the cutters to revolve in opposed relation while at the same time, the blades of the cutter are interlapping, so that there will be no path of uncut grass left after this machine has passed thereover.

A cross bar 32 at the rear of the machine is interposed between the housings 7—7 and has ear portions 33 thereon between which a ground engaging roller 34 is rotatably mounted.

To permit adjustment of the assembly upon which the cutters 28 are mounted, a pair of tubular members 35—35 form housings for half-portions of the shaft 36, and an open bridgework 37 serving to connect the housings 35—35 at their inner opposed ends, however leaving sufficient space to accommodate the hand wheel 38 suitably keyed to the shafts 36, so that, by rotating the wheel 38 manually, the shaft 36 can be rotated and in turn actuate the end gears 39—39 which are located within the housings 7—7.

These gears 39 mesh with the teeth 40 on the rocker plates 41, the rocker plates being each provided with a pair of studs 42—42 operating in guide slots 43 of the housing plate 8, while a screw 44 extends through each of the rocker plates 41 through a corresponding opening 45 in the housing plate 8 to engage with the cutter assembly so as to effect an adjustment thereof, the cutter assembly being supported by the pivots 46. It will be observed that the opening 45 is in fact a slot as is the opening 43.

Obviously when the hand wheel 38 is rotated, the shaft 36 is resultingly operated, and this causes rotation of the gears 39. Of course, before the gears 39 can be rotated, the screws 44 must be loosened. Thus it can be seen that actuation of the gears 39 will tilt the plates 41 with the result that the cutter assembly is tilted to the proper adjusted position.

Numeral 47 represents a handle at the upper end of the shank 48 which has a yoke 49 at its lower end pivotally connected at its end as at 50 to the housings 7.

While the foregoing specification sets forth the invention in specific terms, it is to be understood that numerous changes in the shape, size, and materials may be resorted to without departing from the spirit and scope of the invention as claimed hereinafter.

What is claimed is:

1. A lawn mower comprising a pair of traction wheels, a frame between the said wheels, a cutter assembly interposed between the wheels and supported by the said frame, said cutter assembly including a plurality of transversely aligned horizontally rotatable cutters, drive means between the said traction wheels and the cutters, and means whereby the said cutting assembly can be adjusted with respect to the ground, said means comprising a cross shaft on the frame, a hand wheel on the shaft, a gear at each end of the shaft, a rocker member at each end of the assembly having teeth thereon meshing with one of the said gears, and a connection between each of the rockers and one end of the cutter assembly.

2. A lawn mower comprising a pair of traction wheels, a frame between the said wheels, a cutter assembly interposed between the wheels and supported by the said frame, said cutter assembly including a plurality of transversely aligned horizontally rotatable cutters, drive means between the said traction wheels and the cutters, and means whereby the said cutter assembly can be adjusted with respect to the ground, said means comprising a cross shaft on the frame, a hand wheel on the shaft whereby the shaft can be rotated, a gear on each end of the shaft, a rocker member at each end of the assembly, each of these rocker members being in the form of a plate having teeth at the edge portion thereof meshing with one of the gears on the shaft, said rockers being adapted to support the ends of the cutter assembly, said frame being provided with slots therein, and pins projecting from the rockers into the said slots to limit the movement of the rockers and determine the extent to which the said cutter assembly can be adjusted.

HERBERT L. GOOCH.